US006330091B1

(12) United States Patent
Escobosa et al.

(10) Patent No.: US 6,330,091 B1
(45) Date of Patent: Dec. 11, 2001

(54) IR RECEIVER USING IR TRANSMITTING DIODE

(75) Inventors: Marcus Escobosa, Placentia; Thomas M. Salsman, Rancho Santa Margarita, both of CA (US)

(73) Assignee: Universal Electronics Inc., Cypress, CA (US)

( * ) Notice: Subject to any disclaimer, the term of this patent is extended or adjusted under 35 U.S.C. 154(b) by 0 days.

(21) Appl. No.: 09/080,125

(22) Filed: May 15, 1998

(51) Int. Cl.$^7$ .................................................... H04B 10/28

(52) U.S. Cl. ........................................... 359/143; 348/734

(58) Field of Search ......................... 250/370.01; 257/80, 257/81, 82; 359/146, 152, 142, 143, 144, 145, 147, 148, 189, 194; 348/734; 340/825.72, 825.69, 825.22; 341/176

(56) References Cited

U.S. PATENT DOCUMENTS

| | | | | |
|---|---|---|---|---|
| 4,317,232 | * | 2/1982 | Pickett et al. | 359/152 |
| 4,825,200 | * | 4/1989 | Evans et al. | 341/23 |
| 4,933,563 | | 6/1990 | Thus . | |
| 5,031,196 | * | 7/1991 | Bahlmann et al. | 370/340 |
| 5,075,794 | * | 12/1991 | DeAndrea | 359/194 |
| 5,255,313 | | 10/1993 | Darbee . | |
| 5,552,917 | | 9/1996 | Darbee et al. . | |
| 5,691,710 | | 11/1997 | Pietraszak et al. . | |

* cited by examiner

*Primary Examiner*—Leslie Pascal
*Assistant Examiner*—Christina Y. Leung
(74) *Attorney, Agent, or Firm*—Mark R. Galis; Gary R. Jorosik

(57) ABSTRACT

Circuitry using infra-red (IR) diodes in remote control units. In one embodiment an IR LED is used both as a transmitter diode and also as a receiver diode responsive to light to thereby develop photocurrents and/or voltages for use by external circuitry. In a second embodiment an improved amplifier circuit is provided for an IR LED and IR photo detector diode which is mounted behind, and receives light through, the transmitter IR LED.

4 Claims, 2 Drawing Sheets

IR RECEIVER USING IR TRANSMITTING DIODE

BACKGROUND OF THE INVENTION

This invention relates generally to infra-red ("IR") remote control devices and, more particularly, to learning types of remote control devices.

Infrared remote control transmitters for controlling various functions of television receivers, VCR's, cable decoders and auxiliary equipment have become quite widespread in recent years. The result is often that a user is confronted with a number of different remote controls for controlling various devices made by different manufacturers. Most manufacturers provide transmitters to control their various devices, i.e., TV, VCR, stereo, by re-configuring the transmitter keyboard with a key or switch or the like, and devices of different manufacturers are controlled with different "dedicated" remote control devices. To minimize the number of individual remote control devices a user requires, "learning" universal remote control transmitters have been developed. In a common method of setting up and using universal remote controls, the IR function codes that are to be learned are made available from a teaching transmitter. Learning is accomplished by positioning the teaching and learning transmitters such that IR signals from the teaching transmitter are received by the learning transmitter (remote control device). Next, a program is followed which includes sequentially transmitting the IR function codes associated with the keys of the teaching transmitter to the learning transmitter. The learning transmitter stores the detected IR function codes in its memory and essentially re-configures its keyboard so that the appropriate IR function codes may be transmitted to the device to be controlled. Television sets, VCR's, entertainment media, and other devices can thus employ universal or standard remote controls that can be adapted to control various and sundry brands. Thus, universal remote control devices can learn the commands for controlling each of the various brands and types of devices.

U.S. Pat. No. 5,691,710 issued to Pietraszak et al. and assigned to Zenith Electronics Corp. discloses a self learning IR remote control transmitter of the type mentioned above. U.S. Pat. No. 5,255,313 issued to Darbee and assigned to Universal Electronics Inc., and U.S. Pat. No. 5,552,917 issued to Darbee et al. and assigned to Universal Electronics Inc. also disclose universal remote control systems. The present invention provides an improvement to the circuitry of the systems disclosed in the above-mentioned patents.

It is known that, in addition to the ability of light emitting diodes ("LED's") to provide IR signals, LEDs may also have the ability to receive, be sensitive to, and react to incoming light. One such receiver type of IR circuit is disclosed in U.S. Pat. No. 4,933,563, issued to Thus and assigned to U.S. Philips Corp. Some of the embodiments disclosed in the present invention exploit this dual effect or capability of IR diodes to transmit and receiver IR signals; this feature minimizes the circuitry used with learning remote controls, and also facilitates the retrofitting of learning capability to existing remote control designs, since no re-tooling of the plastic case is needed to accommodate a separate IR receiver.

SUMMARY OF THE INVENTION

This invention provides improved IR diode circuits for use with learning remote controls. In some of the disclosed embodiments, the same IR LED is utilized to transmit and to receive IR signals; and, the inventive circuitry is a component of the IR output circuit for a remote control. In another of the disclosed embodiments, improved circuitry is provided for a transmitter IR LED and a separate receiver IR photo detector diode, and a method if disclosed whereby the IR photo detector can be mounted behind, and receives light input through the plastic encapsulation of, the transmitter IR LED.

The foregoing features and advantages of the present invention will be apparent from the following more particular description of the invention. The accompanying drawings, listed hereinbelow, are useful in explaining the invention.

DESCRIPTION OF THE INVENTION

Figure 1:
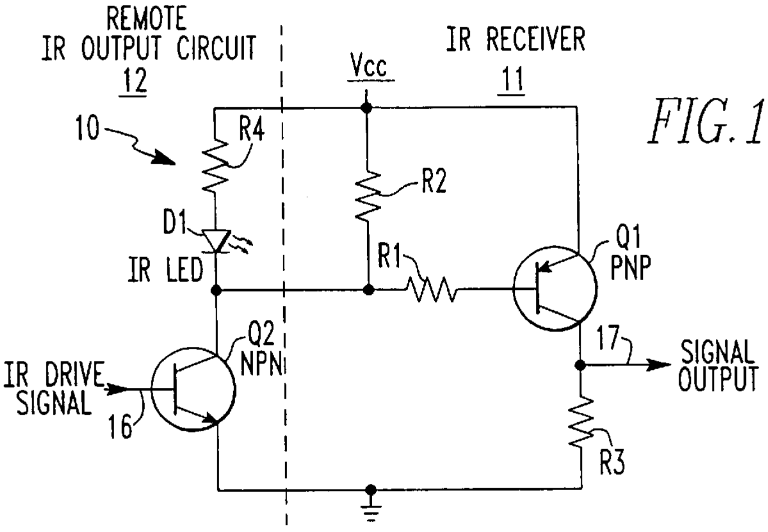
FIG. 1 shows a circuit for providing IR signals and indicates the IR receiver section or addition in accordance with the invention.
Figure 2:
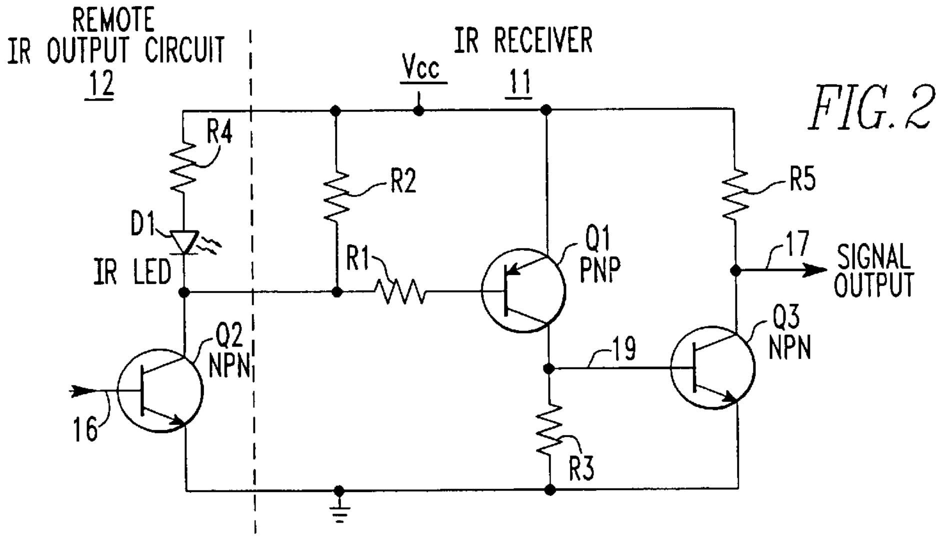
FIG. 2 is similar to FIG. 1 and includes a transistor amplifier that effectively provides greater light sensitivity.
Figure 3:
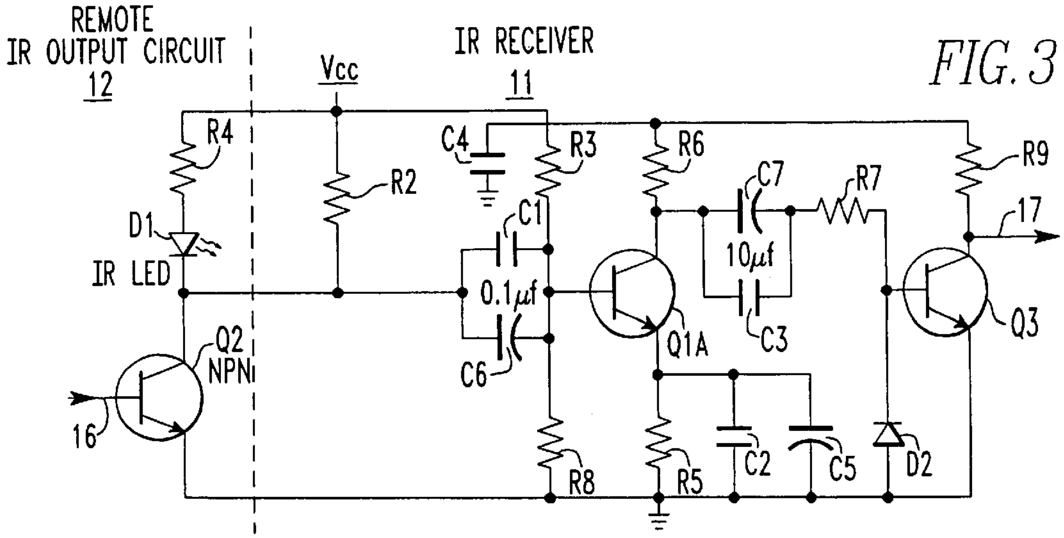
FIG. 3 adds a linear amplifier to the circuit of FIG. 2 to provide a circuit which is even more sensitive.

FIG. 1 shows a basic schematic circuit 10 of the invention. The circuit 10 of FIG. 1 includes a typical remote IR output circuit 12, with an IR LED ("infra-red light emitting diode") D1, which provides an IR output when switching transistor Q2 receives a drive signal. When a remote is transmitting, the infra-red (IR) signal is provided by diode D1, which is effectively connected to the power supply by transistor switch Q2. Resistor R4 limits the current flow through diode D1. The remote IR output circuit labeled 12 on the left of the vertical dotted line in FIGS. 1–3, is known in the art.

The circuit 11 exploits the dual effect or capability of some IR diodes to: a) transmit IR signals; and b) to receive and react to incoming light to generate photocurrents/photovoltages; that is, IR diode D1 functions both as a transmitter and as a receiver.

In the circuit 12, if the drive signal is not present on lead 16, the electrical path from the power supply Vcc through IR diode D1 to ground is disconnected by transistor Q2 and the remote will not transmit an IR signal. Stated in another way, when the diode D1 is not connected to the power supply in response to the IR drive signal on lead 16, it (diode D1) is available for use as a receiving diode. The circuitry of FIG. 1 can thus make use of photo currents and/or voltages that are generated by light impinging on diode D1 to provide signals which are amplified and processed by circuit 11 for use by external circuitry.

The IR receiver circuit 11 includes PNP transistor Q1 that has its emitter connected to the power supply voltage Vcc. The collector of transistor Q1 is connected through resistor R3 to ground reference. The base of transistor Q1 is connected through resistor R1 to the cathode of diode D1, and through resistor R1 and R2 to the power supply. Resistor R1 protects transistor Q1 from short-circuiting the diode D1 when the IR driving circuit, including switching transistor Q2, is activated.

Resistor R2 is a relatively large resistor that removes built up charge generated by the diode D1 when D1 is receiving light. A large value of resistor R2 increases sensitivity to light, but slows response time. A small value of R2 increases response time, but lowers sensitivity. Accordingly, the value of resistor R2 is selected dependent on the response desired.

The signal output of transistor Q1 is taken across resistor R3 on lead 17. A small value of resistor R3 increases speed, a large value of resistor R3 increases sensitivity. Again, the value of resistor R3 is selected based on the response desired.

Under normal lighting conditions, the resistors R1, R2 and R3 are selected so that any voltage developed by D1 is not enough to turn On transistor Q1; and, diode D1 is thus controlled to turn On transistor Q1 (only) in response to signals received from the associated teaching transmitter. The circuit of FIG. 1 draws no power unless an IR drive signal is applied to the circuit. This eliminates the requirement for another microprocessor port pin and power switch circuit.

As mentioned above, in operation, when an IR drive signal is provided to transistor Q2, transistor Q2 conducts and switches the IR diode D1 On to provide an output IR signal. When the drive signal goes Off, transistor Q2 opens, and diode D1 is effectively disconnected from the power source and ceases to provide an IR signal. Diode D1 is sensitive to received light (light impinging thereon) and when transistor Q1 opens, diode D1 generates a photocurrent/voltage that turns On transistor Q1; this provides a signal output across resistor R3. This generated signal is coupled to external circuitry through lead 17.

Thus, when the diode D1 is not providing an IR signal, it is made available for use as a receiving diode. Note that the IR signal developed by diode D1 in response to the IR drive signal is substantially larger than the photocurrents/voltages developed in response to received light. The circuit of FIG. 1 will amplify the output developed by diode D1 from any received light, but will not interfere with IR signal transmission. The output of circuit 11 can thus be used by a microprocessor as a signal source in the learning of a received signal.

FIG. 2 shows a circuit similar to FIG. 1, but with higher sensitivity. FIG. 2 adds NPN transistor Q3 and resistor R5 to the circuit of FIG. 2. In FIG. 2, the output of transistor Q1 is connected through lead 19 to the base of transistor Q3. The collector of transistor Q3 is connected through resistor R5 to power source Vcc, and the emitter of transistor Q3 is connected to ground. The signal output is coupled through lead 17. Thus, transistor Q3 and resistor R5 comprise a second amplifier stage that increases sensitivity to received signals. Similarly as in the circuit of FIG. 1, the circuit of FIG. 2 draws no power unless an IR drive signal is applied to the circuit.

FIG. 3 shows another circuit with even higher sensitivity. In FIG. 3, an NPN transistor Q1A is connected in the circuit to provide linear amplification between switching transistor Q2 and output transistor Q3. The base of transistor Q1A is connected through series capacitor C1 to the junction of transistor Q2 and diode D1 and through resistor R2 to power source Vcc. A second capacitor C6 is connected in parallel to capacitor C1. The base of transistor Q1A is also connected through resistor R9 to neutral. The base of transistor Q1A is connected through resistor R3 to power source Vcc and through capacitor C4 to neutral. The emitter of transistor Q1A is connected through resistor R5 to neutral. Capacitors C2 and C5 are connected in parallel across resistor R5. The collector of transistor Q1A is connected through resistor R6 to power source Vcc. The output of transistor Q1A is developed at the junction of the collector of Q1A and resistor R6. The output is connected through capacitor C7 and resistor R7 to the base of transistor Q3. A second capacitor C3 is connected in parallel with capacitor C7. A reverse connected diode D2 has its cathode connected to the base of transistor Q3 and its anode connected to neutral. Transistor Q1A and the indicated circuitry form a linear amplifier with a large frequency response, as is known. Transistor Q3 and capacitors C3, C7, diode D2 and resistors R7 and R8 form a switching stage that converts the signals generated by diode D1 to signals usable by a microprocessor. Neutral is connected to ground by switch SWI in response to a control signal from the host processor on switch control input. This is needed since the amplifier draws current continuously when connected across its power source. SWI is typically a transistor switch circuit.

Figure 4:
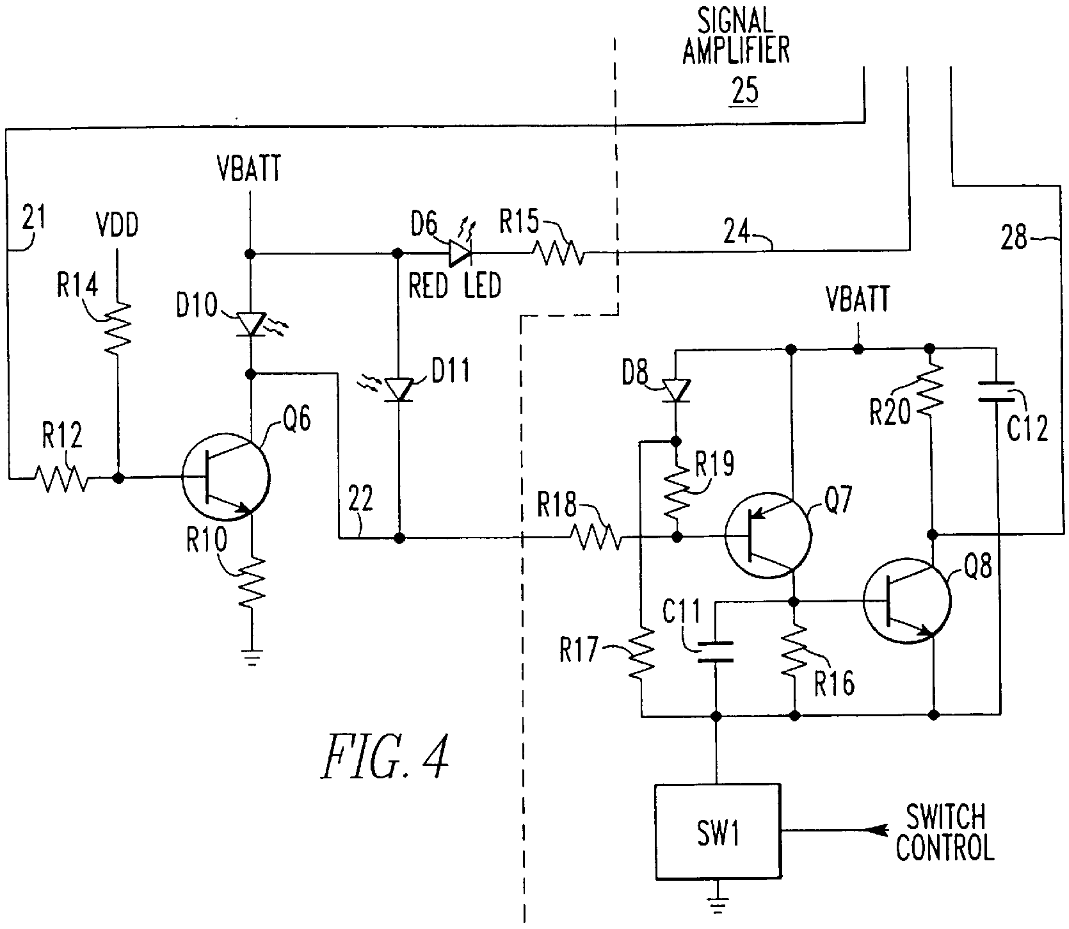
FIG. 4 is another embodiment of the invention wherein an IR transmitter LED is used with or without an IR photo detector diode; and, FIG. 5 is a partial view of a case wherein the circuitry of FIG. 4 may be utilized.

FIG. 4 shows additional embodiments of the invention. One embodiment of the circuit of FIG. 4 is essentially similar to the embodiments of FIGS. 1–3 wherein the same IR diode is used both for transmitting and receiving. (Note that in this embodiment photo detector diode D11 is not in the circuit, this is indicated by the dotted line).

The first embodiment of the circuit of FIG. 4 includes the IR LED D10 which has its anode connected to a battery supply and its cathode connected to the emitter of PNP transistor switch Q6. The collector of transistor Q6 is connected through resistor R10 to ground reference. The base of transistor Q6 is connected through resistor R14 to positive bias. The base of transistor Q6 receives its control signal input via control line 21 through resistor R12. Note that transistor Q6 is a PNP transistor and used in lieu of the NPN input transistor Q2 of FIGS. 1—3; hence, transistor Q6 is driven on by a signal of the opposite polarity, all as is well known. When transistor Q6 is turned on, LED D10 conducts and provides an IR output. As in the case of the circuits of FIGS. 1–3, when the transistor switch Q6 is turned off, the LED D10 functions as a photo detector and the signal developed is coupled through line or lead 22 as an input to a signal amplifier 25, to be described.

A second visible LED D6 has an anode connected to battery supply VBATT and its cathode connected through resistor R12 in control in 24. LED D6 can be of a red color and provide an output such as for indicating the state of the circuit.

Amplifier 25 comprises a PNP transistor Q7 and a NPN transistor Q8. As alluded to above, in one embodiment the base of transistor Q7 is connected through resistor R18 to LED D10, and in another embodiment, the base of transistor Q7 is connected through resistor R18 to photo detector diode D11. The emitter of transistor Q7 is connected to a battery supply, and its collector is connected through resistor R16 to a neutral. A capacitor C11 is connected in parallel with resistor R16. A diode D8 has its anode connected to a battery supply and its cathode connected through resistor R19 to the base of transistor Q7. The junction of diode D8 and resistor R19 is connected through resistor R17 to neutral.

The output of transistor Q7 is coupled from its collector to the base of PNP transistor Q8. The collector of transistor Q8 is connected through resistor R20 to a battery supply and its emitter is connected to neutral. A capacitor C12 is connected across transistor Q8 and resistor R20 to provide a stable voltage and assure that a clean digital signal is provided by transistor Q8, all as is known. The output of transistor Q8 and hence of amplifier 25 is taken from the collector of transistor Q8. As mentioned above, the circuit of the first embodiment of FIG. 4, which circuit includes lead

22 but not photo detector diode D11, operates similarly to the circuits of FIGS. 1–3 to amplify the photocurrents/voltages generated by the LED in response to received light pulses and provide electrical output signals. Neutral is connected to ground by switch SWI in response to a control signal from the host processor on switch control input. This is needed since the amplifier draws current continuously when connected across its power source. SWI is typically a transistor switch circuit.

In the other embodiment of the circuit of FIG. 4, a separate IR photo detector diode D11 is connected in the circuit of FIG. 4. (As stated above, this embodiment includes diode D11 but not lead 22). Diode D11 has its anode connected to battery supply VBATT and its cathode connected through a resistor R18 to the emitter of PNP transistor Q7 of amplifier 25. In this embodiment, the operation of photo diode D11 is effectively separate from that of LED D10.

In operation during the receiving mode, IR photo detector diode D11 is energized by received light pulses. When LED D7 receives an input light pulse it generates a photocurrent thereby providing a signal to turn on transistor Q7. When transistor Q7 conducts, the voltage across resistor R16 goes high, causing transistor Q8 to turn off thereby providing a low output at the collector of transistor Q8 and hence a low voltage output on lead 28. As will be readily appreciated, amplifier 25 thus provides a digital output signal on lead 28 in response to light pulses received by IR photo detector diode D11.

Figure 5:
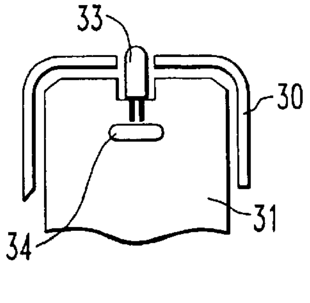

FIG. 5 shows a partial view of a remote control unit wherein the circuitry of FIG. 1–4 can be positioned. A printed circuit board 31 containing the desired one of the circuits of FIGS. 1–4 is mounted within a plastic case 30, usually of an elongated and flat design. A transmitting IR LED 33 is positioned at the end of the case 30 to extend outwardly. If the embodiment with a separate IR photo detector diode is utilized, a receiving photo detector diode 34, is positioned on the printed circuit board 31 to be located behind and near the IR transmitting diode 33. IR energy from the teaching transmitter will radiate through the translucent encapsulation of the IR transmitting diode and stimulate the photo detector diode 34. In other words, the IR photo diode 34 is mounted behind and receives light through the plastic encapsulation of, the IR transmitting diode 33. This approach has great cost advantages as it facilitates the retrofitting of learning capability to existing remote control designs since no retooling of the plastic case is needed to accommodate a separate IR receiver. As a result, an existing remote control design can be retrofit to have a learning capability merely by adding an IR photo detector diode 34 on to the circuit board of the remote control device being retrofit. No changes in case design are necessary (i.e., no modifications to the case are necessary to enable the remote control to accomplish the task of receiving light to the IR photo detector diode 34).

While the invention has been particularly shown and described with reference to a particular embodiment thereof it will be understood by those skilled in the art that various changes in form and detail may be made therein without departing from the spirit and scope of the invention.

What is claimed is:

1. A learning type remote control including circuitry connectable to a supply voltage which circuitry includes:

a) an infra-red (IR) diode, said IR diode being sensitive to received light and capable of generating photocurrents/voltages in response to said received light, b) switching means responsive to an associated drive signal, said switching means selectively connecting and disconnecting said IR diode from said supply voltage to provide an output IR signal in response to said associated drive signal;

c) first amplifying means connecting said IR diode to provide photocurrents/voltages in response to light directed to said IR diode;

d) second amplifying means receiving the output from said first amplifying means to further amplify said photocurrents/voltages; and, e) resistor means connected respectively in series with said first and second amplifying means to selectively control the sensitivity and speed of response of said first and second amplifying means.

2. A learning type remote control including the circuitry as in claim 1 useful with an associated microprocessor wherein the signal provided by said IR diode functioning as a receiver is useful to said microprocessor as a signal source for learning a received signal.

3. A learning type remote control including the circuitry as in claim 2 wherein said circuit comprises a first semiconductor linear amplifier with a large frequency response, and a second switching stage for converting the signal generated by said IR diode into a form useable by said microprocessor.

4. A learning type remote control including the circuitry as in claim 2 wherein said IR diode eliminates the need for a separate microprocessor port pin and power switch circuit.

* * * * *

UNITED STATES PATENT AND TRADEMARK OFFICE

CERTIFICATE OF CORRECTION

PATENT NO. : 6,330,091 B1 
DATED : December 11, 2001
INVENTOR(S) : Marcus Escobosa, Thomas S. Salsman and William L. Brown It is certified that error appears in the above-identified patent and that said Letters Patent is hereby corrected as shown below:

Title page,
Item [75], add -- William L. Brown as inventor --

Column 5,
Line 43, insert -- detector -- before "diode"

Signed and Sealed this

Twenty-seventh Day of August, 2002

*Attest:*

JAMES E. ROGAN

*Attesting Officer* *Director of the United States Patent and Trademark Office*